(12) United States Patent
Senatori (10) Patent No.: US 9,459,662 B2
(45) Date of Patent: Oct. 4, 2016

(54) DISPLAY PANEL BUMPER

(75) Inventor: Mark David Senatori, Austin, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 148 days.

(21) Appl. No.: 14/351,267

(22) PCT Filed: Oct. 14, 2011

(86) PCT No.: PCT/US2011/056283
§ 371 (c)(1),
(2), (4) Date: Apr. 11, 2014

(87) PCT Pub. No.: WO2013/055353
PCT Pub. Date: Apr. 18, 2013

(65) Prior Publication Data
US 2014/0247549 A1    Sep. 4, 2014

(51) Int. Cl.
*G06F 1/16* (2006.01)

(52) U.S. Cl.
CPC .......... *G06F 1/1656* (2013.01); *G06F 1/1601* (2013.01); *G06F 1/1681* (2013.01)

(58) Field of Classification Search
CPC .. G06F 1/1656; G06F 1/1637; G06F 1/1662; G06F 1/166; G06F 1/1677; G06F 1/1675; G06F 1/1679; G06F 1/1681; G06F 1/1601; G06F 1/1616; G06F 1/1618; G06F 1/162; G06F 1/1615; Y10T 16/61; Y10T 16/615; Y10T 16/625; Y10T 16/628; Y10T 16/6285; Y10T 16/629; Y10T 16/6295; E05F 3/20; E05F 5/00; E05F 5/02; E05F 5/025; E05F 5/027; E05F 5/04; E05F 5/06; E05F 5/08; E05F 2005/043; E05F 2005/046; H05K 7/14
USPC ....................................... 361/679.26, 679.27
See application file for complete search history.

(56) References Cited

U.S. PATENT DOCUMENTS

| | | | | |
|---|---|---|---|---|
| 5,768,094 A | * | 6/1998 | Merkel | G06F 1/1616 361/679.11 |
| 6,137,676 A | | 10/2000 | Merkel | |
| 6,314,274 B1 | * | 11/2001 | Kumagai | H04M 1/0214 361/679.13 |
| 6,426,870 B1 | | 7/2002 | Oross et al. | |
| 7,059,182 B1 | | 6/2006 | Ragner | |
| 7,079,383 B2 | | 7/2006 | Homer | |
| 7,349,199 B2 | * | 3/2008 | Tracy et al. | G06F 1/1616 248/615 |
| 2006/0002066 A1 | * | 1/2006 | Doczy et al. | G06F 1/1656 361/679.09 |
| 2006/0203437 A1 | * | 9/2006 | Lev et al. | G06F 1/1616 361/679.06 |
| 2009/0079201 A1 | * | 3/2009 | Escamilla et al. | G06F 1/162 292/10 |

(Continued)

FOREIGN PATENT DOCUMENTS

| | | |
|---|---|---|
| JP | 05-036521 | 5/1993 |
| JP | 2008-065444 | 3/2008 |

OTHER PUBLICATIONS

International Searching Authority, Internation Search Report and Written Opinion, Appln No. PCT/US2011/056283, date of mailing May 21, 2012, 9 p.

(Continued)

*Primary Examiner* — Courtney Smith
*Assistant Examiner* — Christopher L Augustin
(74) *Attorney, Agent, or Firm* — Rathe Lidenbaum LLP (57) ABSTRACT

An apparatus and method move a bumper from a recessed position to a projecting position in response to pivoting of a display panel.

17 Claims, 5 Drawing Sheets

(56) References Cited

U.S. PATENT DOCUMENTS

2009/0231805 A1* 9/2009 Schlesener et al. .......... B29C 45/1676 361/679.55
2011/0016667 A1 1/2011 Huang

OTHER PUBLICATIONS

Maintenance and Service, Guide HP Pavilion dv6000 Notebook PC, http://h10032.www1.hp.com/ctg/Manual/c01035677.pdf, Publication Date: Apr. 2007.

* cited by examiner

DISPLAY PANEL BUMPER

BACKGROUND

Electronic devices sometimes include pivoting display panels. When lowered or closed, such display panels may contact other surfaces which may subject the display panel to damage.

DETAILED DESCRIPTION OF THE EXAMPLE EMBODIMENTS

Figures 1, 2, 3, 4:
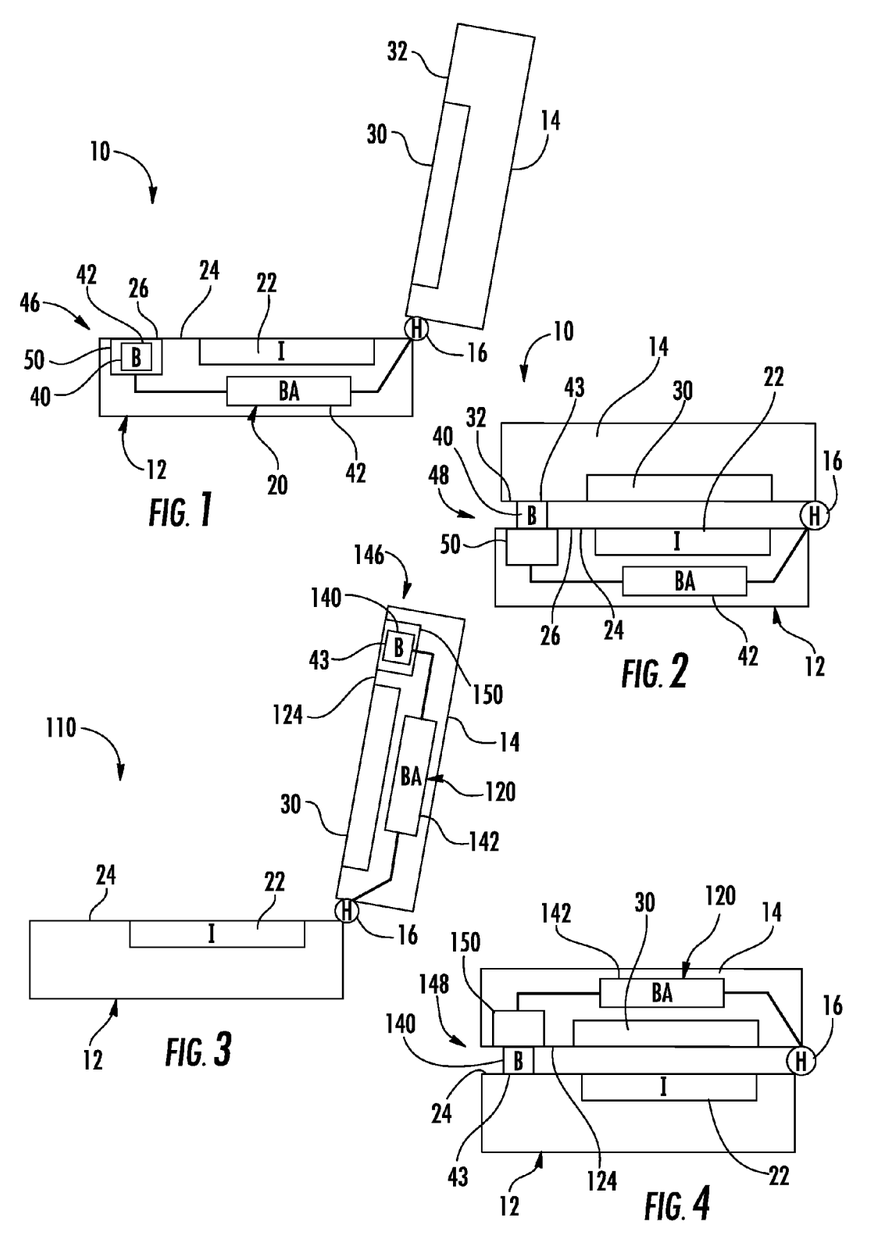
FIG. 1 is a schematic illustration of an example display bumper system with an electronic device display panel being raised.
FIG. 2 is a schematic illustration of the example display bumper system of FIG. 1 with the electronic device display panel being lowered.
FIG. 3 is a schematic illustration of another example display bumper system with the electronic device display panel being raised.
FIG. 4 is a schematic illustration of the display bumper system example of FIG. 3 with the electronic device display panel being lowered.

FIGS. 1 and 2 schematically illustrate an example electronic device 10 provided with a display bumper system 20. FIG. 1 illustrates electronic device 10 with a raised display panel 14. FIG. 2 illustrates electronic device 10 with the display panel 14 closed or lowered. As will be described hereafter, display bumper system 20 protects display panel 14 when the display panel 14 is in a closed state or position. At the same time, display bumper system 20 minimally interferes with the aesthetics and use of electronic device 10. In addition to display panel 14 and display bumper system 20, electronic device 10 comprises deck 12 and hinge 16.

Deck 12 comprises a base, pad or other structure which is configured to rest upon an underlying supporting surface or to be manually grasped and held while supporting display panel 14 in the elevated or raised position. Deck 12 further comprises input device 22 (schematically shown). Input device 22 comprises at least one device by which a person may provide input to electronic device 10. Input device 22 extends along an upper face 24 of deck 12. According to one example, input device 22 comprises a keyboard or key pad having individual keys which may be depressed or otherwise actuated. In such an example, deck 12 may further comprise a hand rest surface 26 upon which a person may rest his or her hands when entering input with input device 22. Hand rest surface 26 is located upon deck face 24 such that input device 22 is located on face 24 between surface 26 and hinge 16 and between surface 26 and display panel 14 in the plane of face 24 when display panel 14 is raised.

In other examples, input device 22 may additionally or alternatively include other forms of input devices such as a touch pad or the like. Depending upon the type of other input device 22, deck face 24 may include or may omit hand rest surface 26. According to yet other examples, input device 22 may be omitted or may be provided as part of display panel 14. For example, input device 22 may be provided as part of a touch screen provided by display panel 14.

Display panel 14 comprises a panel or other structure providing a screen or display area 30 by which visual information or graphics may be presented to a person using electronic device 10. In the example shown, display area 30 is at least partially surrounded by a bezel or frame 32. In other examples, display area 30 may alternatively extend completely to an edge of display panel 14. Examples of display area 30 include, but are not limited to, a liquid crystal display (LCD), a plasma display, an OLED display and the like.

Hinge 16 pivotably couples display panel 14 to deck 12. Hinge 16 comprises a mechanical structure connecting display panel 14 to deck 12 while allowing display panel 14 and deck 12 to rotate or pivot relative to one another such that display panel 14 may pivot between the raised position shown in FIG. 1 and the lowered position shown in FIG. 2. In one example, hinge 16 allows display panel 14 to pivot about a centerline or axis of hinge 16. In another example, hinge 16 is configured to allow display panel 14 to pivot about multiple axes.

Display bumper system 20 protects display area 30 when the display panel 14 is in the lowered or collapsed state or position shown in FIG. 2. At the same time, display bumper system 20 minimally interferes with the aesthetics and use of electronic device 10 when display panel 14 is raised. Display bumper system 20 comprises bumper 40 and bumper actuator 42.

Bumper 40 comprises a member configured to project from or beyond one of deck face 24 and display panel 14 so as to contact or bear against the other of deck face 24 and display panel 14. Bumper 40 serves as an interface or spacer between deck face 24 and display panel 14 to space display area 30 out of contact with deck 24. In the example illustrated, bumper 40 further spaces input device 22 out of contact and away from display panel 14. In one example, bumper 40 includes a compressible, elastomeric, soft (softer relative to the harder face 24 of deck 12) rubber-like surface 43 which contacts the other of deck face 24 and display panel 14 when display panel 14 is lowered. As a result, bumper 40 may provide some shock absorption and acoustic absorption when display panel 14 is lowered and closed. In other examples, bumper 40 may have a hardness similar to that of input device 22 and face 24.

In the example illustrated, bumper 40 is movably supported by deck 12 between a recessed position 46 shown in FIG. 1 and a projecting position 48 shown in FIG. 2. As shown by FIG. 1, when in the recessed position or state 46, surface 43 of bumper 40 is recessed within a cavity or recess 50 relative to face 24. As a result, bumper 42 is visually concealed when deck 24 is viewed from a side of deck 24, preserving aesthetics. Moreover, when recessed, bumper 40 minimally interferes with hand rest surface 26 such that bumper 40 does not uncomfortably project into the hand or hands of a person more so than surface 26 and is less likely to catch upon other objects.

For purposes of this disclosure, the term recessed and the use of the term recessed to describe relative positioning of two surfaces or structures means that one structure or surface is at (coextensive or coplanar with) or withdrawn into or below the other structure or surface. In other words, one surface or structure "recessed" relative to another surface or structure will not project beyond a plane of the surrounding other surface or structure and will not generally be viewable from the side of the structure absent a side opening in communication with the recessed structure or surface.

As shown by FIG. 2, when bumper 40 is in the projecting position, bumper 40 projects beyond cavity 50 and projects beyond surface 26 such that surface 43 of bumper 40 contacts display panel 14. Bumper 40 projects beyond face 24 and has a height or extended length above the face 24 such that display area 30 is spaced out of contact with face 24 and such that input device 22 is spaced out of contact with display panel 14. In the example shown, surface 43 is movably supported by deck 12 so as to contact bezel or frame 42, further reducing overall contact with display area 30. In other examples, such as where display area 30 extends completely to an edge of display panel 14, surface 43 may contact portions of display area 30.

Bumper actuator 42 comprises a mechanism to move bumper 40 between the recessed position 46 and the projecting position 48 in response to pivoting of display panel 14 between the raised position shown in FIG. 1 and the lowered position shown in FIG. 2. In the example illustrated, bumper actuator 42 moves bumper 40 without reliance upon a power source such as a battery. Bumper actuator 42 transmits or transfers movement or motion of display panel 14, as display panel 14 is being pivoted, to bumper 40 to move bumper 40. In one example, bumper 40 may be resiliently biased in one of the recessed or projecting positions, wherein pivotal movements of display panel 14 moves bumper 40 against the bias to the other of the recessed or projecting positions.

In one example, bumper actuator 42 comprises one or more cam/cam follower arrangements to transmit pivotal motion of display panel 14 to linear movement of bumper 42 raise and lower bumper 40. Bumper actuator 42 may have a mechanical linkage with first end portion operably coupled to hinge 16 and with a second end portion operably coupled to bumper 40. In another example, bumper actuator 42 may utilize gear trains, belt or chain and pulley or sprocket arrangements to convert and transmit such motion as appropriate to move bumper 40. In still other examples, instead of utilizing motion provided by the pivotal movement of display panel 14, bumper actuator 20 may alternatively include a powered actuator, such as an electric solenoid, and a sensor or switch to move bumper 40 in response to sensed pivotal movement or the since positioning of display panel 14.

FIGS. 3 and 4 schematically illustrate electronic device 110, another example of electronic device 10. Electronic device 110 is similar to electronic device 10 except that electronic device 110 includes display bumper system 120 in place of display bumper system 20. Those remaining elements or components of electronic device 110 which correspond to components or elements of electronic device 10 are numbered similarly. Display bumper system 120 is similar to display bumper system 20 except that display bumper system 120 is housed within and carried by display panel 14 instead of deck 12. Display bumper system 120 comprises bumper 140 and bumper actuator 120.

Bumper 140 is similar to bumper 40 except that bumper 140 is movably supported by display panel 14 between a recessed position or state 146 shown in FIG. 3 and a projecting position or state 148 shown in FIG. 4. As shown by FIG. 3, when in the recessed position 146, surface 43 of bumper 140 is recessed within a cavity or recess 150 relative to surface 124 of display panel 14. As a result, bumper 140 is visually concealed when display panel 14 is viewed from a side of display panel 14, preserving aesthetics. Moreover, when recessed, bumper 140 is less likely to catch up on other objects.

As shown by FIG. 4, when bumper 140 is in the projecting position, bumper 140 projects beyond cavity 150 and projects beyond surface 124 such that surface 43 of bumper 140 contacts face 24 of deck 12. Bumper 140 projects beyond surface 124 and has a length extending from the surface 124 such that display area 30 is spaced out of contact with face 24 and such that input device 22 is spaced out of contact with display panel 14. In the example shown, surface 142 is movably supported by display panel 14 so as to contact a portion of face 24 which surrounds input device 22, reducing contact with input device 22.

Bumper actuator 142 is similar to bumper actuator 42 except that bumper actuator 142 is carried and housed within display panel 14. As with bumper actuator 42, bumper actuator 142 moves bumper 140 without reliance upon a power source such as a battery. Bumper actuator 142 transmits or transfers movement or motion of display panel 14, as display panel 14 is being pivoted, to bumper 140 to move bumper 140. In one example, bumper 140 may be resiliently biased in one of the recessed or projecting positions, wherein pivotal movement of display panel 14 moves bumper 140 against the bias to the other of the recessed or projecting positions.

In one example, bumper actuator 142 comprises one or more cam/cam follower arrangements to transmit pivotal motion of display panel 14 to linear movement of bumper 140 to extend and retract bumper 140. In another example, bumper actuator 142 may utilize gear trains, belt or chain and pulley or sprocket arrangements to convert and transmit such motion as appropriate to move bumper 140. In still other examples, instead of utilizing motion provided by the pivotal movement of display panel 14, bumper actuator 142 may alternatively include a powered actuator, such as an electric solenoid, and a sensor or switch to move bumper 140 in response to sensed pivotal movement of display panel 14.

FIGS. 5-11 illustrate electronic device 210 (shown as a laptop computer), an example of electronic device 10. Electronic device 210 is similar to electronic device 10 in that electronic device 210 utilizes a bumper system 220 to protect a display panel 214. In addition to display panel 214 and bumper system 220, electronic device 210 comprises deck 212 and hinge 216.

Deck 212 comprises a base, pad or other structure which is configured to rest upon an underlying supporting surface while supporting display panel 214 in the elevated or raised position. Deck 12 comprises input devices 222A, 222B (collectively referred to as input devices 222), hand rest surfaces 226 and deck perimeter surfaces 228. Input devices 222 comprise devices by which a person may provide input to electronic device 210. Input device 222A comprises a keyboard. Input device 222B comprises a touch pad. In the example illustrated, input device 222B comprises a fingerpointing surface, a left click surface and a right-click surface which simulate commands of a mouse. In other examples, input devices 222 may have other forms.

Hand rest surfaces 226 comprise surfaces upon which a person may rest his or her hands when entering input with input devices 222. Hand rest surfaces 226 are located upon deck face 224 such that input device 222A is located on face 224 between surfaces 226 and hinge 216 and between surface 226 and display panel 214 in the plane of face 24 when display panel 214 is raised.

Figure 10:
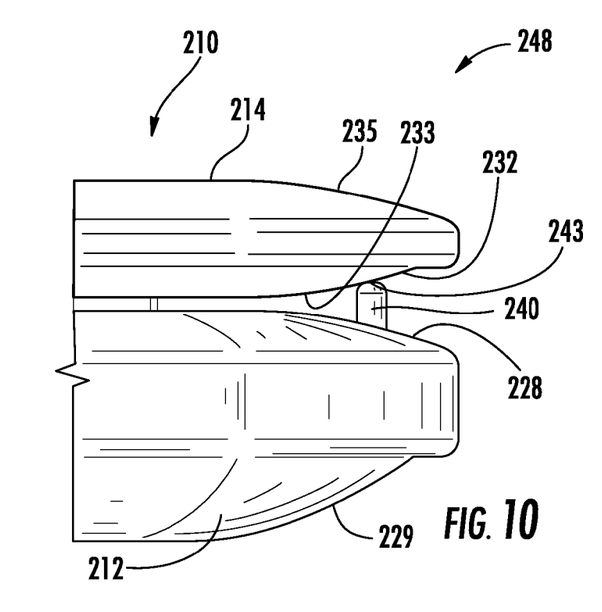
FIG. 10 is a fragmentary side elevational view of the display bumper system example of FIG. 5 with the electronic device display panel being lowered.

Deck perimeter surfaces 228 comprise surfaces along an outer perimeter of face 24 that face display panel 214 when display panel 214 is closed. As shown in FIG. 10, the perimeter surfaces 228 comprise curved, convex surfaces. Deck perimeter surfaces 229 (shown in FIG. 10) comprise curved, convex surfaces facing away from surfaces 228. As a result, deck 228 visually appears thinner.

Display panel 214 comprises a panel or other structure providing a screen or display area 230 by which visual information or graphics may be presented to a person using electronic device 210. Examples of display area 230 include, but are not limited to, a liquid crystal display (LCD), a plasma display, an OLED display and the like. In the example shown, display area 230 is at least partially surrounded by a bezel or frame 232. Frame 232 comprises a curved, convex surface 233 that faces surface 228 when display panel 214 is closed. As shown by FIG. 10, display panel 214 also has a curved convex surface 235 facing away from surface 233. As a result, display panel 234 visually appears thinner.

Hinge 216 pivotably couples display panel 214 to deck 212. Hinge 216 comprises a mechanical structure connecting display panel 214 to deck 212 while allowing display panel 214 and deck 212 to rotate or pivot relative to one another such that display panel 214 may pivot between the raised position shown in FIG. 5 and the lowered position shown in FIG. 8. In the example illustrated, hinge 216 allows display panel 214 to pivot about a centerline or axis of a shaft 247 (shown in FIG. 11) of hinge 216. In another example, hinge 216 is configured to allow display panel 214 to pivot about multiple axes.

Figures 7, 8:
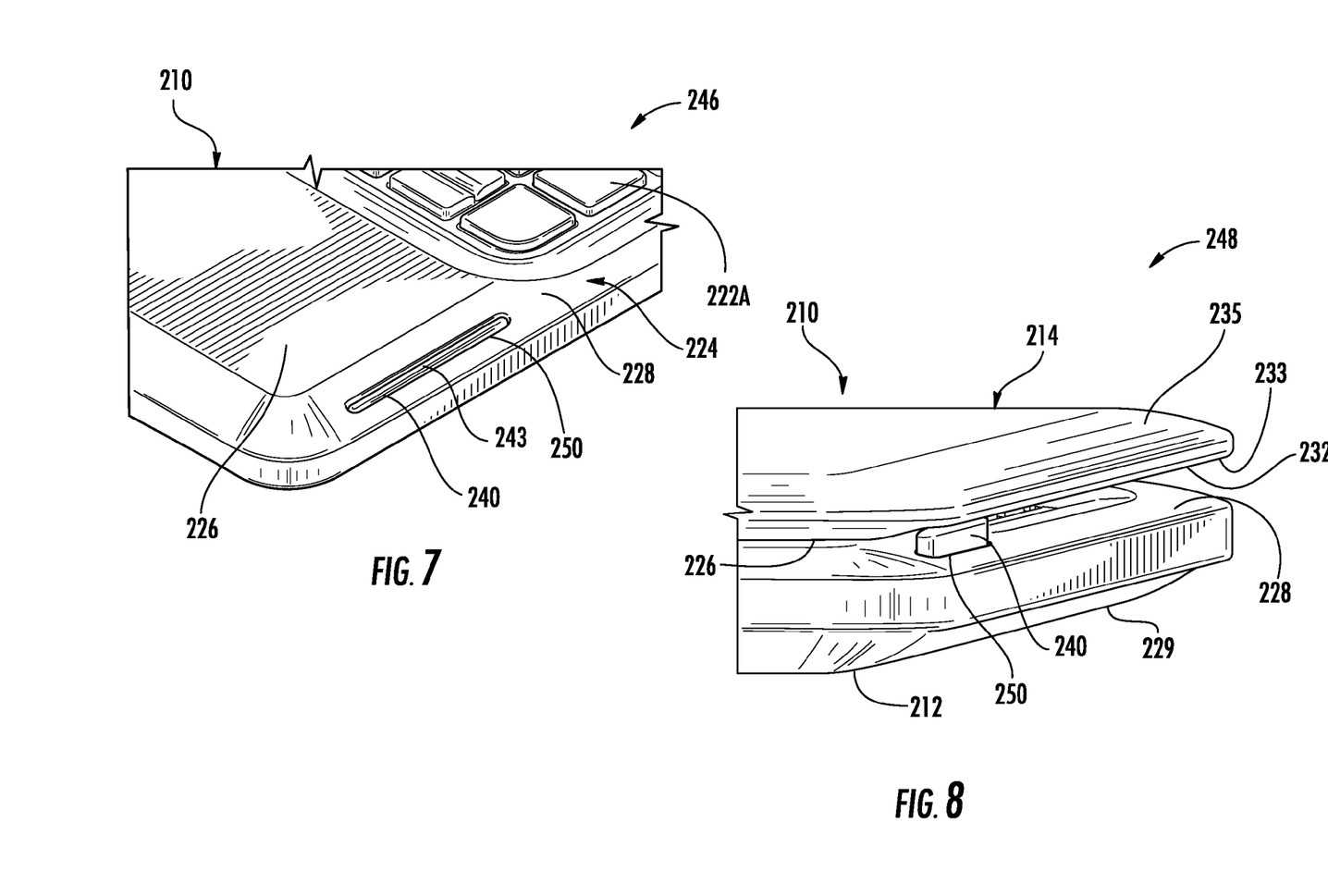
FIG. 7 is an enlarged fragmentary perspective view of the display bumper system example of FIG. 5 with the electronic device display panel being raised.
FIG. 8 is an enlarged fragmentary perspective view of the display bumper system example of FIG. 5 with the electronic device display panel being lowered.
Figure 11:
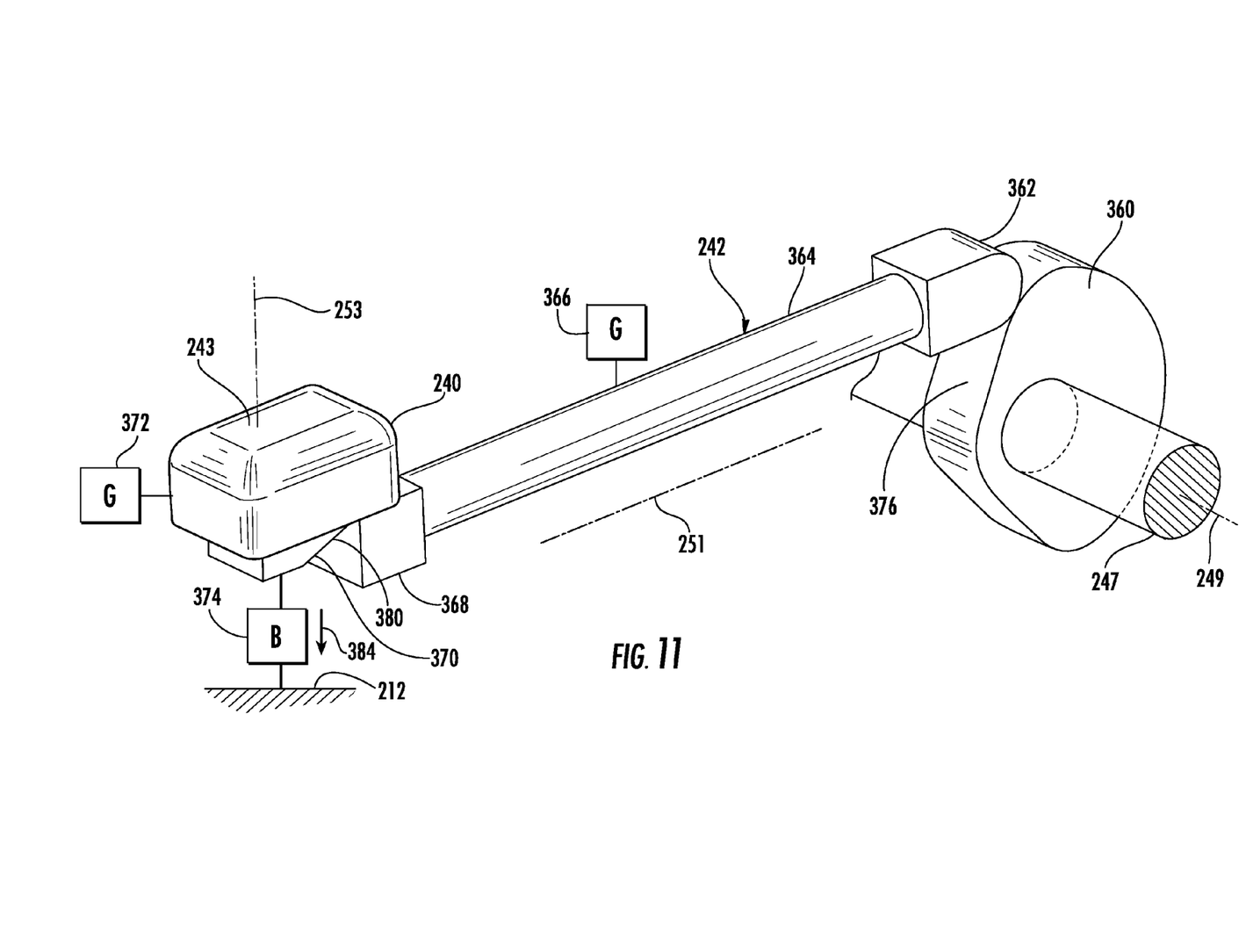
FIG. 11 is a top perspective view of an example display bumper system.

Display bumper system 220 protects display area 230 when the display panel 214 is in the lowered or closed position shown in FIGS. 8 and 10. At the same time, display bumper system 220 minimally interferes with the aesthetics and use of electronic device 210 when display panel 214 is raised. Display bumper system 220 comprises bumpers 240 and bumper actuators 242 (one of which is shown in FIG. 11). Bumper 240 comprises a member configured to project from or beyond one of deck face so as to contact or bear against surface 233 of frame 232 of display panel 14. Bumper 240 serves as an interface or spacer between deck face 224 and display panel 214 to space display area 230 out of contact with deck 212. In the example illustrated, bumper 240 further spaces input devices 222 out of contact and away from display panel 214. In one example, bumper 240 includes a compressible, elastomeric, soft (softer relative to the harder face 224 of deck 212) rubber-like surface 243 which contacts the other of deck face 224 and display panel 214 when display panel 214 is lowered. As a result, bumper 240 may provide some shock absorption and acoustic absorption when display panel 214 is lowered and closed. In other examples, bumper 240 may have a hardness similar to that of input device 222 and face 224.

Figures 5, 6:
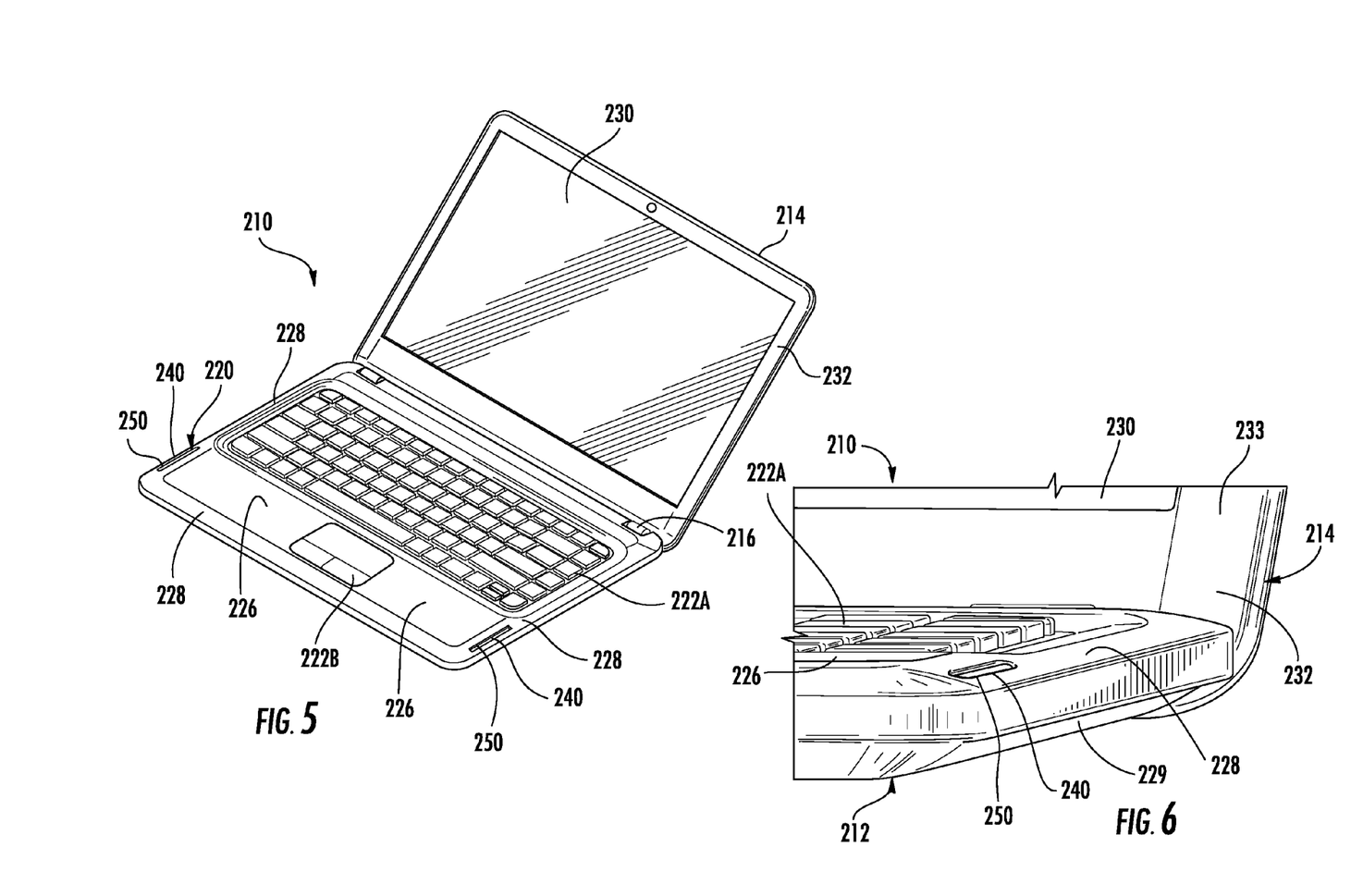
FIG. 5 is a top perspective view of another example display bumper system with an electronic device display panel being raised.
FIG. 6 is an enlarged fragmentary perspective view of the display bumper system example of FIG. 5 with the electronic device display panel being raised.
Figure 9:
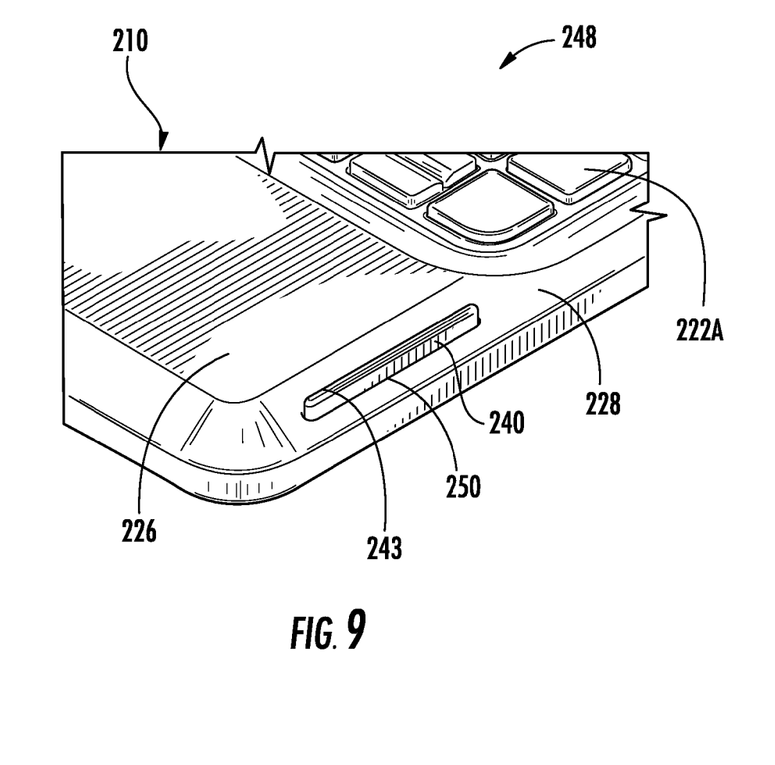
FIG. 9 is an enlarged fragmentary perspective view of the display bumper system example of FIG. 8 with the electronic device display panel being lowered, but omitted for purposes of illustration.

In the example illustrated, bumper 240 is movably supported by deck 212 between a recessed position 246 shown in FIGS. 5, 6 and 7 and a projecting position 248 shown in FIGS. 9 and 10. As shown by FIG. 7, when in the recessed position 246, surface 242 of bumper 240 is recessed within a cavity or recess 250 relative to face 224. As a result, bumper 240 is visually concealed when deck 212 is viewed from a side of deck 212, preserving aesthetics. Moreover, when recessed, bumper 240 minimally interferes with hand rest surfaces 226 such that bumper 240 does not uncomfortably project into the hand or hands of a person more so than surfaces 226 and is less likely to catch up on other objects.

As shown by FIGS. 8 and 10, when each of bumpers 240 is in the projecting position, each of bumpers 240 projects beyond cavity 250 and projects beyond surface 228 such that surface 243 of each of bumpers 240 contacts display panel 214. Each of bumpers 240 projects beyond face 224 and has a height or extended length above the face 224 such that display area 230 is spaced out of contact with face 224 and such that input devices 222 are spaced out of contact with display panel 214. In the example shown, surface 243 is movably supported by deck 212 so as to contact bezel or frame 232, further reducing overall contact with display area 230. In other examples, such as where display area 30 extends completely to an edge of display panel 214, surface 243 may contact portions of display area 230.

As shown by FIG. 5, in the example illustrated, bumpers 240 are located on opposite transverse sides of deck 212. As a result, bumpers 240 uniformly and stably support display panel 213 when display panel 214 is closed. At the same time, bumpers 240 and their associated cavities 250 remain to sides of hand rest surfaces 226, not interfering with the use of hand rest surfaces 226. In other examples, bumpers 240 may be provided at additional or alternative locations.

Bumper actuators 242 comprise mechanisms configured to move an associated bumper 240 between the recessed position 246 and the projecting position 248 in response to pivoting of display panel 214 between the raised position and the lowered position. In the example shown, bumper system 220 includes two bumper actuators 242, one actuator 242 for each bumper 240. In the example illustrated, bumper actuator 242 moves the associated bumper 240 without reliance upon a power source such as a battery. Bumper actuator 242 transmits or transfers movement or motion of display panel 214, as display panel 214 is being pivoted, to bumper 240 to move bumper 240. Bumper actuator 242 converts rotational movement or torque of shaft 247 of hinge 216, during pivoting of display panel 214, to linear or translational movement of bumper 240. In the example illustrated, rotational movement about axis 249 of shaft 247 is converted to linear or translational movement along axis 251. The movement along axis 251 is then converted to linear or translational movement along axis 253, axis 252 being substantially perpendicular to each of axes 249 and 253.

As shown by FIG. 11, each bumper actuator 242 comprises cam 360, cam follower 362, linkage 364, linkage guides 366, cam 368, cam follower 370, bumper guides 372 and bias 374. Cam 360 comprises a disc or lobe eccentrically coupled to shaft 247 to rotate with shaft 247 and to impart translational movement to cam follower 362. Cam follower 362 comprises a member coupled to linkage 364 and in contact with a cam surface 376 of cam 360. Cam follower rides against surface 376 during rotation of cam 360.

Linkage 364 comprises one or more members movably supported by guides 366 between com follower 362 and cam 368. In the example shown, linkage 364 comprises a single tube, rod or shaft. In other examples, linkage 364 may comprise multiple operably interconnected shafts. Examples of guides 366 include, but are not limited to, sleeves, bearings, guiding tabs and the like which facilitate sliding movement of linkage 364.

Cam 368 comprises a member coupled to linkage 364 to move with movement of linkage 364 and to contact cam follower 370. Cam follower 370 comprises a member coupled to bumper 240 to move with bumper 240. In the example illustrated, cam follower includes a sloped or ramped surface 380 which rides against cam follower 368. In other examples, cam 368 may include the ramped surface, wherein cam follower 370 rides against the ramped surface of cam 368. Although cam 368 and cam follower 370 are illustrated as utilizing a linear or planar ramped surface with a flat profile to convert motion along axis 252 to motion along axis 253, in other examples, other interacting cam and cam follower surface arrangements may be used, such as curved surfaces and the like.

Bumper guides 372 comprise structures or surfaces that interact with and contact bumper 340 to guide movement of bumper 340 along axis 253. In one example, guides 372 may comprise side edges of cavity 250. In other examples, more elaborate guides, such as bearings or the like may be utilized.

Bias 374 comprises one or more members to resiliently urge cam 368 and cam follower 370 into contact with one another and to resiliently urge cam follower into contact with surface 376 of cam 360. In one example, bias 374 comprises a tension spring having a first end fixed to deck 212 and a second end attached to bumper 240 or cam follower 370 so as to urge bumper 340 along axis 253 in the direction indicated by arrow 384. In other examples, other bias mechanisms may be used. In some examples, bias 374 may be solely provided by the weight of bumper 240 and gravity.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
   a deck;
   a display panel pivotable relative to the deck between a raised position and a lowered position;
   a first bumper movable between a projecting position projecting above the deck and a recessed position, wherein the first bumper moves in response to pivoting of the display panel;
   a hinge-pivotably supporting the display panel;
   a first cam coupled to the hinge to rotate with the hinge;
   a link arm having a first cam follower in contact with the first cam and a second cam; and
   a second cam follower coupled to the first bumper such that rotation of the hinge rotates the first cam to translate the link arm to move the first bumper between the projecting position and the recessed position.

2. The apparatus of claim 1, wherein the first bumper is mechanically coupled to the display panel such that motion of the display panel during pivoting is transmitted to the first bumper to move the first bumper between the projecting position and the recessed position.

3. The apparatus of claim 1 further comprising a second bumper movable between a projecting position projecting above the deck and a recessed position recessed at or below an upper surface of the deck, wherein the second bumper moves in response to pivoting of the display panel.

4. The apparatus of claim 3, wherein the first bumper and the second bumper are configured to contact the display panel to resist movement of the display panel towards and into contact with the deck when the display panel is in the lowered position.

5. The apparatus of claim 3, wherein the first bumper and the second bumper are configured to contact the display panel outside a display area of the panel and to resist movement of the display panel towards and into contact with the deck when the bumper is in the projecting position.

6. The apparatus of claim 1, wherein the first bumper is configured to contact the display panel to resist movement of the display panel towards and into contact with the deck when the display panel is in the lowered position.

7. The apparatus of claim 1, wherein the first bumper is configured to contact the display panel outside a display area of the panel when in the projecting position.

8. The apparatus of claim 1, wherein the first bumper projects through and above a convex surface of the deck.

9. The apparatus of claim 8, wherein the display panel includes a second convex surface, wherein the bumper contacts the second convex surface when in the projecting position.

10. The apparatus of claim 1, wherein the first bumper comprises a rubber-like surface to contact the display panel in the projecting position.

11. The apparatus of claim 1 further comprising:
    a second bumper actuator comprising:
    a third cam coupled to the hinge to rotate with the hinge;
    a second link arm having a third cam follower in contact with the third cam and a fourth cam; and
    a fourth cam follower coupled to the second bumper such that rotation of the hinge rotates the third cam to translate the second link arm to move the second bumper between the projecting position and the recessed position.

12. The apparatus of claim 1, wherein the first bumper spaces the display panel from and out of contact with the deck when in the projecting position.

13. The apparatus of claim 1, wherein the first bumper has sides and a top and wherein the top contacts the display panel when the first bumper is in the projecting position and when the display panel is in the lowered position.

14. The apparatus of claim 1 further comprising:
    a motion transmitting mechanism within the deck, the motion transmitting mechanism having a first portion connected to the hinge and a second portion connected to the first bumper such that torque from rotation of the hinge is transmitted to the first bumper to move the first bumper between the raised position and the lowered position.

15. The apparatus of claim 1 further comprising a mechanism below an upper surface of the deck and operably coupled to the bumper to automatically move the bumper to the projecting position in response to pivoting of the display panel towards the deck.

16. The apparatus of claim 1, wherein the first bumper comprises an elongated bar extending parallel to a side of the deck.

17. An apparatus comprising:
a deck;
a display panel pivotable relative to the deck between a raised position and a lowered position;
a first bumper movable between a projecting position projecting above the deck and a recessed position recessed at or below an upper surface of the deck, wherein the first bumper moves in response to pivoting of the display panel; and
a second bumper movable between a projecting position projecting above the deck and a recessed position recessed at or below an upper surface of the deck, wherein the second bumper moves in response to pivoting of the display panel, wherein the first bumper and the second bumper are configured to contact the display panel when the display panel is in the lowered position and wherein the first bumper and the second bumper are configured to contact the display panel outside a display area of the display panel when in the projecting position;
a hinge-pivotably supporting the display panel;
a link arm having a first cam follower in contact with a first cam and a second cam, the first cam coupled to the hinge to rotate with the hinge; and
a second cam follower coupled to the tint bumper such that rotation of the hinge rotates the first cam to translate the link area to move the first bumper between the projecting position and the recessed position.

* * * * *

UNITED STATES PATENT AND TRADEMARK OFFICE
CERTIFICATE OF CORRECTION

PATENT NO. : 9,459,662 B2
APPLICATION NO. : 14/351267
DATED : October 4, 2016
INVENTOR(S) : Senatori Page 1 of 1

It is certified that error appears in the above-identified patent and that said Letters Patent is hereby corrected as shown below:

In the Claims

Column 10, Line 13, Claim 17, delete "tint" and insert -- first --, therefor.

Signed and Sealed this
Third Day of January, 2017

Michelle K. Lee
*Director of the United States Patent and Trademark Office*